(12) United States Patent
Bao et al.

(10) Patent No.: US 11,863,381 B2
(45) Date of Patent: Jan. 2, 2024

(54) RECONFIGURATION METHOD AND TERMINAL

(71) Applicant: VIVO MOBILE COMMUNICATION CO., LTD., Guangdong (CN)

(72) Inventors: Wei Bao, Chang'an Dongguan (CN); Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 416 days.

(21) Appl. No.: 17/164,372

(22) Filed: Feb. 1, 2021

(65) Prior Publication Data

US 2021/0160136 A1 May 27, 2021

Related U.S. Application Data

(63) Continuation of application No. PCT/CN2019/096704, filed on Jul. 19, 2019.

(30) Foreign Application Priority Data

Aug. 1, 2018 (CN) .......................... 201810864515.4

(51) Int. Cl.
*H04L 41/0816* (2022.01)
*H04W 76/19* (2018.01)
(Continued)

(52) U.S. Cl.
CPC ........ *H04L 41/0816* (2013.01); *H04L 5/0048* (2013.01); *H04W 74/0833* (2013.01); *H04W 76/18* (2018.02); *H04W 76/19* (2018.02)

(58) Field of Classification Search
CPC ............... H04L 41/0816; H04L 5/0048; H04L 41/0661; H04L 5/001; H04L 5/0035;
(Continued)

(56) References Cited

U.S. PATENT DOCUMENTS 9,674,852 B2 * 6/2017 Heo .................. H04W 36/0069
2008/0305797 A1 * 12/2008 Somasundaram .... H04W 24/10
455/450
(Continued)

FOREIGN PATENT DOCUMENTS

CN 104468029 A 3/2015
CN 104812010 A 7/2015
(Continued)

OTHER PUBLICATIONS

"Drop Call Optimization"; Zhang; LTE Optimization Engineering Handbook, First Edition. Xincheng Zhang. © 2018 John Wiley & Sons Singapore Pte. Ltd. Published 2018 by John Wiley & Sons Singapore Pte. Ltd. (Year: 2018).*
(Continued)

*Primary Examiner* — Benjamin H Elliott, IV
(74) *Attorney, Agent, or Firm* — Maschoff Brennan

(57) ABSTRACT

Provided in the present disclosure is a redistribution method and terminal, which solve the problem of the transmission currently carried out by a UE needing to be stopped during the process of re-establishing an RRC connection. The processing method of the present disclosure comprises: when the wireless connection between a terminal and a master node (MN) is lost, reporting an MN wireless connection lost indication to a secondary node (SN); if an RRC redistribution message is received before a target timer times out, carrying out redistribution processing according to said RRC redistribution message.

18 Claims, 4 Drawing Sheets

(51) Int. Cl.
*H04W 76/18* (2018.01)
*H04L 5/00* (2006.01)
*H04W 74/08* (2009.01)

(58) Field of Classification Search
CPC .............. H04L 5/0096; H04L 43/0811; H04W 74/0833; H04W 76/18; H04W 76/19; H04W 76/15; H04W 76/27
See application file for complete search history.

(56) References Cited

U.S. PATENT DOCUMENTS

| | | | | |
|---|---|---|---|---|
| 2015/0117183 | A1* | 4/2015 | Heo | H04W 48/08 370/242 |
| 2015/0133122 | A1* | 5/2015 | Chen | H04W 76/15 455/436 |
| 2015/0215826 | A1* | 7/2015 | Yamada | H04W 36/0072 455/436 |
| 2016/0057800 | A1* | 2/2016 | Ingale | H04L 5/0032 370/216 |
| 2016/0242224 | A1* | 8/2016 | Liu | H04W 48/16 |
| 2016/0285716 | A1* | 9/2016 | Pelletier | H04L 43/0811 |
| 2016/0338137 | A1* | 11/2016 | Mishra | H04W 36/08 |
| 2017/0041880 | A1* | 2/2017 | Ouchi | H04L 5/0053 |
| 2018/0160436 | A1* | 6/2018 | Park | H04W 76/14 |
| 2019/0166646 | A1* | 5/2019 | Shih | H04W 72/04 |
| 2019/0261347 | A1* | 8/2019 | Harada | H04W 72/21 |
| 2019/0289510 | A1* | 9/2019 | Rugeland | H04W 36/0069 |
| 2020/0045745 | A1* | 2/2020 | Cirik | H04W 24/08 |
| 2020/0274679 | A1* | 8/2020 | Futaki | H04W 56/001 |
| 2020/0314946 | A1* | 10/2020 | Tsuboi | H04W 24/10 |
| 2020/0344019 | A1* | 10/2020 | Da Silva | H04L 1/203 |
| 2021/0160136 | A1* | 5/2021 | Bao | H04L 5/0048 |

FOREIGN PATENT DOCUMENTS

| | | | |
|---|---|---|---|
| CN | 105101253 | A | 11/2015 |
| CN | 105917716 | A | 8/2016 |
| CN | 105992393 | A | 10/2016 |
| JP | 2016-048957 | A | 4/2016 |
| RU | 2602981 | C2 | 11/2016 |
| WO | 2015/150912 | A2 | 10/2015 |
| WO | 2016/182670 | A1 | 11/2016 |
| WO | 2018/028969 | A1 | 2/2018 |
| WO | 2018088538 | A1 | 5/2018 |
| WO | 2018/128572 | A1 | 7/2018 |

OTHER PUBLICATIONS

WIPO ISR English translation of PCT/CN2015/096704, dated Sep. 26, 2019 (Year: 2019).*
Singapore Office Action issued in corresponding application No. 11202100958T, dated Oct. 7, 2022.
JP Office Action in Application No. 2021-505381 dated Apr. 12, 2022.
IN Office Action in Application No. 202127007725 dated Jan. 24, 2022.
"3rd Generation Partnership Project; Technical Specification Group Radio Access Network; Evolved Universal Terrestrial Radio Access (E-UTRA); Radio Resource Control (RRC); Protocol specification (Realase 13)" 3GPP TS 36.331 V13.10.0, (Jun. 2018).
KR Office Action in Application No. 10-2021-7005767 dated Feb. 14, 2022.
"Introduction of SA" 3GPP TSG-WG2 Meeting #102AH, R2-1810388, Jul. 2, 2018, Ericsson (Rapporteur).
CN Office Action in Application No. 201810864515.4 dated Jan. 26, 2021.
Written Opinion and International Search Report in Application No. PCT/CN2019/096704 dated Feb. 11, 2021.
EP Search Report in Application No. 19843355.9 dated Aug. 20, 2021.
RU Office Action in Application No. 2021104493/07(009882) dated Aug. 27, 2021.
"Supplementary SRB in MCG failure for NR" 3GPP TSG-RAN WG2 #97, LG Electronics Inc., R2-1701639, Feb. 13, 2017.
"Radio Link Failure Detection in Multi-connectivity" 3GPP TSG-RAN WG2 Meeting #97bis, Nokia, Alcatel-Lucent Shanghai Bell, R2-1703022, Apr. 3, 2017.
"Discussion on MCG/SCG failure handling for NE-DC" 3GPP TSG-RAN WG2#AH1807, Huawei, HiSilicon, R2-1810704, Jul. 2, 2018.

* cited by examiner

RECONFIGURATION METHOD AND TERMINAL

CROSS REFERENCE TO RELATED APPLICATIONS

This application is a continuation application of PCT Application No. PCT/CN2019/096704 filed on Jul. 19, 2019, which claims priority to Chinese Patent Application No. 201810864515.4 filed on Aug. 1, 2018 in China, which is incorporated herein by reference in its entirety.

TECHNICAL FIELD

The present disclosure relates to the technical field of communication application, and in particular, to a reconfiguration method and a terminal.

BACKGROUND

When communication between user equipment or a terminal (User Equipment, UE) and a network encounters a problem, the UE needs to initiate a radio resource control (Radio Resource Control, RRC) connection re-establishment procedure. The RRC connection re-establishment procedure is used to re-establish a signaling connection between the network and the UE, that is, a signaling radio bearer (Signaling Radio Bearer, SRB1).

The problem of communication between the UE and the network includes the following cases:
- a radio link failure occurred between the UE and a master base station (Master Node, MN) (for example, a timer T310 set by the UE to detect downlink quality of the MN expires, the UE performs RACH attempts on a MAC layer for the maximum number of times, but fails, and the UE performs retransmission in an AM mode on an RLC layer for the maximum number of times, but fails);
- the UE has a handover failure;
- signaling transmitted on an SRB1 or an SRB2 and received by the UE has an integrity check failure; and
- the UE cannot execute an RRC reconfiguration instruction sent by the network (for example, a reconfigured parameter value exceeds a hardware capability of the UE).

However, in the RRC connection re-establishment process, transmission that is being performed by the UE needs to be interrupted, affecting user experience.

SUMMARY

According to a first aspect, the present disclosure provides a reconfiguration method, applied to a terminal, where the terminal is connected to at least two base stations, and the method includes:
- when a connection failure occurred between the terminal and a master base station MN, reporting a radio connection failure indication of the MN to a secondary base station SN; and
- if receiving an RRC reconfiguration message before a target timer expires, performing reconfiguration processing according to the RRC reconfiguration message.

According to a second aspect, an embodiment of the present disclosure further provides a terminal, where the terminal is connected to at least two base stations, and includes:

- a reporting module, configured to: when a connection failure occurred between the terminal and a master base station MN, report a radio connection failure indication of the MN to a secondary base station SN; and
- a reconfiguration module, configured to: if receiving an RRC reconfiguration message before a target timer expires, perform reconfiguration processing according to the RRC reconfiguration message.

According to a third aspect, an embodiment of the present disclosure further provides a terminal, including: a memory, a processor, and a computer program stored in the memory and executable on the processor, where the computer program, when executed by the processor, implements the steps of the foregoing reconfiguration method.

According to a fourth aspect, an embodiment of the present disclosure further provides a computer-readable storage medium, where the computer-readable storage medium stores a computer program, and the computer program, when executed by a processor, implements the steps of the foregoing reconfiguration method.

The embodiments of the present disclosure have the following beneficial effects:

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other accompanying drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure. The expression "and/or" used in the claims and the specification means at least one of connected objects.

The following description provides examples and does not limit the scope, applicability, or configuration set forth in the claims. Alterations may be made to functions and arrangements of the discussed elements without departing from the spirit and scope of the present disclosure. In various examples, various procedures or components may be omitted, replaced, or added appropriately. For example, the described methods can be performed in a different order from that described, and various steps can be added, omitted, or combined. In addition, features described with reference to some examples may be combined in other examples.

Figure 1:
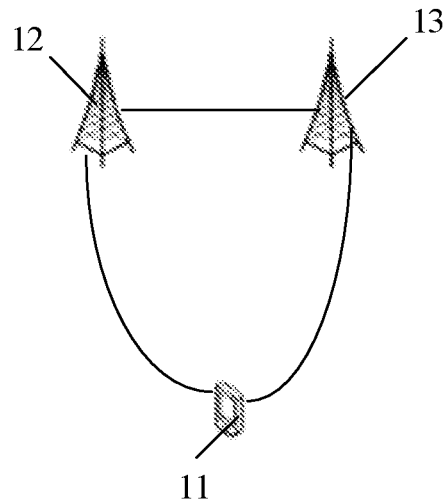
FIG. 1 is a structural diagram of a network system to which an embodiment of the present disclosure can be applied.

Referring to FIG. 1, FIG. 1 is a structural diagram of a network system to which an embodiment of the present disclosure can be applied. As shown in FIG. 1, the network system includes: a user terminal 11, a first base station 12, and a second base station 13. The user terminal 11 may be user equipment (User Equipment, UE), for example, may be a terminal side device such as a mobile phone, a tablet computer (Tablet Personal Computer), a laptop computer (Laptop Computer), a personal digital assistant (personal digital assistant, PDA), a mobile Internet device (Mobile Internet Device, MID), or a wearable device (Wearable Device). It should be noted that a specific type of the user terminal 11 is not limited in this embodiment of the present disclosure. The first base station 12 and the second base station 13 may be base stations of 5G or later releases (for example, a gNB or a 5G NR NB), or base stations in other communications systems, or are referred to as NodeBs, evolved NodeBs, transmitting receiving points (transmitting receiving point, TRP), or other terms in the art. Provided that the same technical effects are achieved, the base stations are not limited to specific technical terms. It should be noted that in the embodiments of the present disclosure, the 5G base station is merely used as an example, but specific types of the base stations are not limited.

Embodiments of the present disclosure provide a reconfiguration method, applied to a terminal, where the terminal is connected to at least two base stations. To make a person skilled in the art better understand the technical solutions in the embodiments of the present disclosure, the following descriptions are provided first.

(1) Dual Connectivity or Multi-Connectivity

Dual connectivity is a technology introduced in a long term evolution (Long Term Evolution, LTE) system, and will also be used in new radio (New Radio, NR). Dual connectivity means that UE can connect to two base stations at the same time, and the two base stations provide data receiving and sending services for user equipment or a terminal (User Equipment, UE) at the same time. Since radio resources of the two base stations can be used at the same time, a transmission rate of service data of the UE doubles.

There is a signaling interface between the two base stations serving the same UE, so that the two base stations can exchange related configuration information of the UE.

The base stations serving the UE in dual connectivity may belong to a same radio access type (Radio Access Type, RAT), for example, may be two LTE eNBs, or may belong to different RATs, for example, may be one LTE eNB and one NR gNB.

One of the base stations serving the UE in dual connectivity is a master base station (Master Node, MN), and the other is a secondary base station (Secondary Node, SN). Each base station can support carrier aggregation (Carrier Aggregation, CA). A network configures two special cells (special cell) for the UE in dual connectivity, that is, configures a serving cell of the MN as a primary cell (Primary Cell, PCell) of the UE, and configures a serving cell of the SN as a primary secondary cell (Primary Secondary Cell, PScell) of the UE. Other cells of the MN and the SN that serve the UE are secondary cells (Secondary Cell, Scell) of the UE.

Multi-connectivity means that more than two base stations serve the same UE, and is similar to dual connectivity. One of the base stations serving the UE in multi-connectivity is a master base station (Master Node, MN), and the other base stations are secondary base stations (Secondary Node, SN). Each base station can support CA.

A network configures multiple special cells (special cell) for the UE in multi-connectivity, that is, configures a serving cell of the MN as a primary cell (Primary Cell, PCell) of the UE, and configures a serving cell of each SN as a primary secondary cell (Primary Secondary Cell, PScell) of the UE. Other cells of the MN and the SN that serve the UE are secondary cells (Secondary Cell, Scell) of the UE.

(2) Carrier Aggregation

In LTE, a maximum system bandwidth of each cell is 20 MHz. One base station may manage multiple cells with different center frequencies. When the UE with a CA capability needs a large bandwidth (for example, needs to download a large file at a high speed), the base station may configure the multiple cells with different frequencies that are managed by the base station (the UE needs to be within the coverage of the multiple cells with the frequencies), to transmit data for the UE at the same time. For example, five cells of 20 MHz are configured for the UE, so that the UE can transmit data in a 100 MHz bandwidth at the same time. The base station configures, for the UE in a connected state by using RRC signaling, a set of carriers that can be aggregated. Among cells of the set of carriers aggregated, one cell is a primary cell (Primary Cell, PCell), and another cell is a secondary cell (Secondary Cell, SCell).

An NR system also uses a carrier aggregation technology similar to that of LTE.

(3) RLM and RLF

In LTE and NR systems, the UE monitors whether there is a radio link failure (Radio Link Failure, RLF) through a radio link monitor (Radio Link Monitor, RLM) function. After determining that there is an RLF, the UE performs a corresponding link restoration procedure.

The RLM is performed only in a PCell and a PScell.

(3.1) RLM and RLF in a PCell

In the RLM function of LTE, the UE monitors a radio link by measuring a signal to interference plus noise ratio (SINR) of a cell reference signal CRS corresponding to a physical downlink control channel PDCCH of the PCell. When a physical layer (L1) of the UE obtains through measurement that the SINR of the CRS corresponding to the PDCCH of the PCell is lower than a threshold, it is considered that the radio link is "out of sync". The physical layer notifies an upper layer (RRC layer, L3) of an out-of-sync indication. If the RRC layer receives N310 consecutive out-of-sync indications, the RRC layer of the UE starts a timer T310.

If the measured SINR of the CRS corresponding to the PDCCH of the PCell is higher than a threshold, it is considered that the radio link is "in sync". In this case, the physical layer notifies the upper layer (RRC layer) of an in-sync indication. If the RRC layer receives N311 consecutive in-sync indications while the timer T310 is running, the UE stops the timer T310.

If the timer T310 expires, the UE determines that the UE has a radio link failure (RLF), and starts the timer T311. the UE tries to search for a suitable cell for RRC connection re-establishment while T311 is running. After the UE determines the RLF and before the re-establishment succeeds, exchange of user plane data between the UE and the network is interrupted.

If the re-establishment of the UE does not succeed before T311 expires, the UE switches from the RRC-connected (RRC-CONNECTED) state to the RRC-idle (RRC-IDLE) state.

Values of N310 and N311 and durations of T310 and T311 are all configured by the network.

The RLM process of NR is similar to that of LTE. In NR, an RLM reference signal RS detected in the PCell is configured by the network.

As can be seen from the foregoing descriptions, in the process of RRC connection re-establishment, the transmission that is being performed by the UE needs to be interrupted. In dual connectivity or multi-connectivity, a signaling message may also be transmitted between the UE and the SN (for example, through an SRB1s and an SRB3). Therefore, when the radio link failure occurred between the UE and the MN, the re-establishment process may not be performed, and instead, the SN that can perform communication reports radio connection failure information to the network and the UE is reconfigured by the network.

Figure 2:
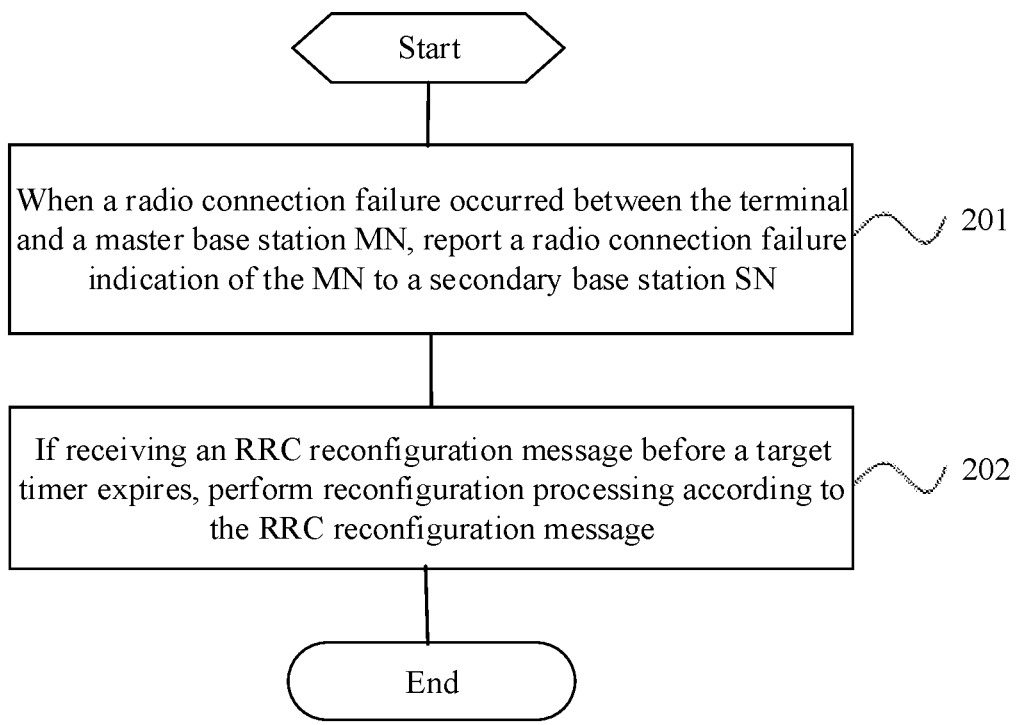
FIG. 2 is a first schematic flowchart of a reconfiguration method according to an embodiment of the present disclosure.

On this basis, as shown in FIG. 2, an embodiment of the present disclosure provides a reconfiguration method, applied to a terminal, where the terminal is connected to at least two base stations, and the reconfiguration method includes:

Step 201: When a radio connection failure occurred between the terminal and a master base station MN, report a radio connection failure indication of the MN to a secondary base station SN.

Herein, a radio connection failure includes the following cases:
- a radio link failure occurred between the UE and an MN (for example, a timer T310 set by the UE to detect downlink quality of the MN expires, the UE performs MAC layer RACH attempts for the maximum number of times, but fails, and the UE performs RLC layer AM mode retransmission for the maximum number of times, but fails);
- the UE has a switching failure;
- signaling transmitted on an SRB1 or an SRB2 and received by the UE has an integrity check failure; or
- the UE cannot execute an RRC reconfiguration instruction sent by the network (for example, a reconfigured parameter value exceeds a hardware capability of the UE).

That is, the reconfiguration method in this embodiment of the present disclosure is applied to at least one of the following cases: a radio link failure occurred between the UE and an MN, the UE has a handover failure, signaling transmitted on an SRB1 or an SRB2 and received by the UE has an integrity check failure, and the UE cannot execute an RRC reconfiguration instruction sent by the network.

In the following description, for example, a radio connection failure is a radio link failure. Specifically, when radio link failure between the terminal and the MN is detected, the terminal generates a radio link failure indication of the MN and reports the MN radio link failure indication to the SN.

When the terminal monitors whether the radio link failure occurred between the terminal and the master base station MN, the method described above or other existing mechanisms may be adopted. Details are not repeated herein.

The radio connection failure indication of the MN includes:
at least one of an MN radio connection failure reason and a measurement result of the terminal, where the measurement result of the terminal is used by the network to reselect a serving cell for the UE.

When the radio connection failure is a radio link failure, the radio connection failure indication of the MN is a radio link failure indication.

Step 202: If receiving an RRC reconfiguration message before a target timer expires, perform reconfiguration processing according to the RRC reconfiguration message.

The RRC reconfiguration message is determined according to the MN radio link failure indication.

In the embodiments of the present disclosure, in a process of generating or sending the radio connection failure indication of the MN, the terminal starts the target timer T. A specific start time of the target timer T includes:
a preset moment in a process of generating the radio connection failure indication of the MN, where
the preset moment may be a start moment at which a radio resource control RRC layer generates the radio connection failure indication of the MN, or may be an end moment at which the radio resource control RRC layer generates the radio connection failure indication of the MN, or may be any moment between the start moment and the end moment, and the preset moment is agreed on in a protocol;
a moment at which an RRC layer of the terminal submits the radio connection failure indication of the MN to a lower layer; or
a moment at which the radio connection failure indication of the MN is sent at an air interface.

In addition, the network may notify the UE of a timing length of the target timer T by using dedicated RRC signaling or a system message.

The RRC reconfiguration message is a reconfiguration message including a specific IE (Information Element, Information Element), and the specific IE may be a synchronous reconfiguration (reconfigurationWithSync) IE, or a full configuration IE (fullConfig), or a master cell group IE (masterCellGroup), or a failure indication response IE; or may be another specified IE in the RRC reconfiguration message, where a specific type of the specified IE is agreed on in a protocol; or
the RRC reconfiguration message is a reconfiguration message for instructing the terminal to modify a primary cell Pcell; or
the RRC reconfiguration message is a reconfiguration message for instructing the terminal to modify a radio link monitoring reference signal RS of a primary cell Pcell.

In the embodiments of the present disclosure, when the UE reports the MN connection failure indication to the SN, the network may reconfigure the UE at the same time. That is, the UE reports the radio connection failure indication of the MN at the moment T1, and at the same time, the network sends the RRC reconfiguration message. At the subsequent moment T2, the UE receives the reconfiguration message sent by the network. However, the reconfiguration message received by the UE at the T2 moment may not be used by the network to resolve the problem of the MN radio connection failure. Therefore, the network needs to use a specific identifier/IE to notify the UE that the current reconfiguration can resolve the MN radio connection failure.

In the reconfiguration method in this embodiment of the present disclosure, when the radio connection failure occurred between the terminal and the master base station MN, the radio connection failure indication of the MN is reported to the secondary base station SN; and if the RRC reconfiguration message is received before a target timer expires, reconfiguration processing is performed according to the RRC reconfiguration message, to prevent the UE from initiating an RRC connection re-establishment process, and therefore avoid the problem of interruption of data receiving and sending of the UE.

Further, the reconfiguration method in this embodiment of the present disclosure further includes:

when the RRC layer receives the RRC reconfiguration message or performs the reconfiguration processing according to the RRC reconfiguration message, stopping the target timer.

Herein, the RRC reconfiguration message includes an RRC connection reconfiguration (RRC Connection Reconfiguration) message of LTE and an RRC reconfiguration (RRC Reconfiguration) message of NR.

In the embodiments of the present disclosure, if the connection between the terminal and the MN is re-established, the terminal stops the target timer. Restoration of the radio connection may mean that the RRC layer receives the RRC reconfiguration message or performs the reconfiguration processing according to the RRC reconfiguration message.

Further, restoration of the radio connection may also mean that the terminal receives a reconfiguration message including a synchronous reconfiguration IE, and the terminal completes a random access process. On this basis, when the RRC reconfiguration message is a reconfiguration message including a synchronous reconfiguration IE, after the performing reconfiguration processing according to the RRC reconfiguration message, the method further includes:

initiating a random access process according to the RRC reconfiguration message; and if the RRC layer of the terminal receives, before the target timer expires, a random access success indication sent by a media access control MAC layer, stopping the target timer.

Herein, if the terminal receives a synchronous RRC connection reconfiguration message (a reconfiguration message including a synchronous reconfiguration IE) when the target timer runs, after random access to a RACH succeeds, the terminal stops the target timer T.

The RRC reconfiguration message includes an RRC connection reconfiguration (RRC Connection Reconfiguration) message of LTE and an RRC reconfiguration (RRC Reconfiguration) message of NR.

Further, after the radio connection failure indication of the MN is reported to the secondary base station SN, the method further includes:

if the target timer expires, initiating an RRC connection re-establishment process.

Herein, when the UE reports the radio connection failure indication of the MN to the network, the target timer T is started. If the MN radio connection still has not been re-established when T expires, the UE performs RRC connection re-establishment.

In the reconfiguration method in this embodiment of the present disclosure, the terminal reports the MN connection failure to the SN, so that the network reconfigures the UE in time, to prevent the UE from initiating an RRC connection re-establishment process, and therefore avoid the problem of interruption of data receiving and sending of the UE.

Figure 3:
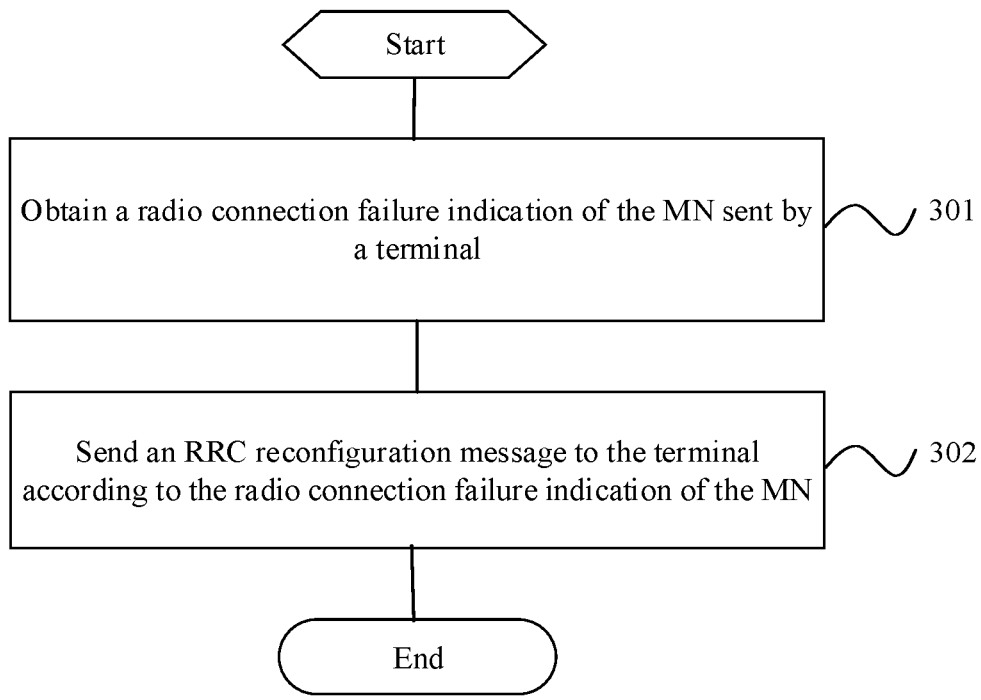
FIG. 3 is a second schematic flowchart of a reconfiguration method according to an embodiment of the present disclosure.

As shown in FIG. 3, an embodiment of the present disclosure further provides a reconfiguration method, applied to a base station, where the reconfiguration method includes:

Step 301: Obtain a radio connection failure indication of the MN sent by a terminal.

Herein, the base station is specifically a secondary base station SN connected to the terminal. The MN radio link failure indication is sent by the terminal to the secondary base station SN when the terminal detects that a radio connection failure occurred between the terminal and a master base station MN.

Herein, a radio connection failure includes the following cases:

a radio link failure occurred between the UE and an MN (for example, a timer T310 set by the UE to detect downlink quality of the MN expires, the UE performs MAC layer RACH attempts for the maximum number of times, but fails, and the UE performs RLC layer AM mode retransmission for the maximum number of times, but fails);

the UE has a handover failure;

signaling transmitted on an SRB1 or an SRB2 and received by the UE has an integrity check failure; or the UE cannot execute an RRC reconfiguration instruction sent by the network (for example, a reconfigured parameter value exceeds a hardware capability of the UE).

The radio connection failure indication of the MN includes at least one of an MN radio connection failure reason and a measurement result of the terminal, where the measurement result of the terminal is used by the network to reselect a serving cell for the UE.

Step 302: Send an RRC reconfiguration message to the terminal according to the radio connection failure indication of the MN.

Specifically, after receiving the radio connection failure indication of the MN, the secondary base station SN reports the radio connection failure indication of the MN to the master base station MN. The master base station MN determines the RRC reconfiguration message according to the radio connection failure indication of the MN, and sends the RRC reconfiguration message to the secondary base station SN, and then the secondary base station SN sends the RRC reconfiguration message to the terminal.

Alternatively, after receiving the radio connection failure indication of the MN, the secondary base station directly determines the RRC reconfiguration message according to the radio connection failure indication of the MN, and sends the RRC reconfiguration message to the terminal.

In the embodiments of the present disclosure, the RRC reconfiguration message is a reconfiguration message including a specific information element (Information Element, IE), and the specific IE may be a synchronous reconfiguration (reconfigurationWithSync) IE, or a full configuration IE (fullConfig), or a master cell group IE (masterCellGroup), or a failure indication response IE; or may be another specified IE in the RRC reconfiguration message, where a specific type of the specified IE is agreed on in a protocol; or the RRC reconfiguration message is a reconfiguration message for instructing the terminal to modify a primary cell Pcell; or the RRC reconfiguration message is a reconfiguration message for instructing the terminal to modify a radio link monitoring reference signal RS of a primary cell Pcell.

It should be noted that the failure indication response IE indicates that the current reconfiguration is a response to the MN radio link failure indication reported by the terminal.

In an optional implementation, the radio connection failure indication of the MN carries a number, and the failure indication response IE is also a number. If the two numbers are the same, it indicates that the failure indication response IE is an IE corresponding to the radio connection failure indication of the MN.

In the reconfiguration method in this embodiment of the present disclosure, the radio connection failure indication of the MN sent by the terminal is obtained; and the RRC reconfiguration message is sent to the terminal according to the radio connection failure indication of the MN, so that the terminal is reconfigured according to the RRC reconfiguration message, to prevent the UE from initiating an RRC connection re-establishment process, and therefore avoid the problem of interruption of data receiving and sending of the UE.

Figure 4:
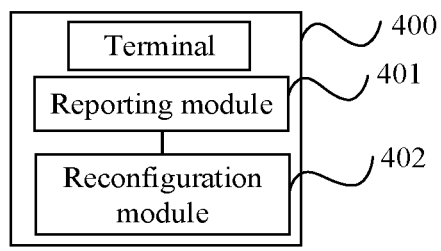
FIG. 4 is a schematic diagram of modules of a terminal according to an embodiment of the present disclosure.

FIG. 4 is a schematic diagram of modules of a terminal according to an embodiment of the present disclosure. As shown in FIG. 4, an embodiment of the present disclosure further provides a terminal 400. The terminal is connected to at least two base stations, and includes:
- a reporting module 401, configured to: when a connection failure occurred between the terminal and a master base station MN, report a radio connection failure indication of the MN to a secondary base station SN; and
- a reconfiguration module 402, configured to: if receiving an RRC reconfiguration message before a target timer expires, perform reconfiguration processing according to the RRC reconfiguration message.

In the terminal in this embodiment of the present disclosure, a start time of the target timer includes:
- a moment at which a radio resource control RRC layer of the terminal generates the radio connection failure indication of the MN; or
- a moment at which an RRC layer of the terminal submits the radio connection failure indication of the MN to a lower layer; or
- a moment at which the radio connection failure indication of the MN is sent at an air interface.

In the terminal in this embodiment of the present disclosure, the RRC reconfiguration message is a reconfiguration message including a specific information element IE, and the specific information element IE is a synchronous reconfiguration IE, or a full configuration IE, or a master cell group IE, or a failure indication response IE; or the RRC reconfiguration message is a reconfiguration message for instructing the terminal to modify a primary cell Pcell; or the RRC reconfiguration message is a reconfiguration message for instructing the terminal to modify a radio link monitoring reference signal RS of a primary cell Pcell.

The terminal in this embodiment of the present disclosure further includes:
- a first control module, configured to: when the RRC layer receives the RRC reconfiguration message or performs the reconfiguration processing according to the RRC reconfiguration message, stop the target timer.

When the RRC reconfiguration message is a reconfiguration message including a synchronous reconfiguration IE, the terminal in this embodiment of the present disclosure further includes:
- a first processing module, configured to: after the reconfiguration module performs reconfiguration processing according to the RRC reconfiguration message, initiate a random access process according to the RRC reconfiguration message; and
- a second control module, configured to: if the RRC layer of the terminal receives, before the target timer expires, a random access success indication sent by a media access control MAC layer, stop the target timer.

The terminal in this embodiment of the present disclosure further includes:
- a second processing module, configured to: after the reporting module reports the MN radio link failure indication to the secondary base station SN, if the target timer expires, initiate an RRC connection re-establishment process.

According to the terminal in this embodiment of the present disclosure, the MN radio link failure indication includes:
- at least one of an MN radio connection failure reason and a measurement result of the terminal.

When the radio connection failure occurred between the terminal and the master base station MN, the terminal in this embodiment of the present disclosure reports the radio connection failure indication of the MN to the secondary base station SN; and if the RRC reconfiguration message is received before a target timer expires, performs reconfiguration processing according to the RRC reconfiguration message, to prevent the UE from initiating an RRC connection re-establishment process, and therefore avoid the problem of interruption of data receiving and sending of the UE.

An embodiment of the present disclosure further provides a terminal, including: a memory, a processor, and a computer program stored in the memory and executable on the processor. The computer program, when executed by the processor, implements the processes of the foregoing embodiments of the reconfiguration method applied to the terminal, and the same technical effects can be achieved. To avoid repetition, details are not described herein again.

An embodiment of the present disclosure further provides a computer-readable storage medium, where the computer-readable storage medium stores a computer program. The computer program, when executed by the processor, implements the processes of the foregoing embodiments of the reconfiguration method applied to the terminal, and the same technical effects can be achieved. To avoid repetition, details are not described herein again. The computer-readable storage medium is a read-only memory (Read-Only Memory, ROM), a random access memory (Random Access Memory, RAM), a magnetic disk, an optical disc, or the like.

Figure 5:
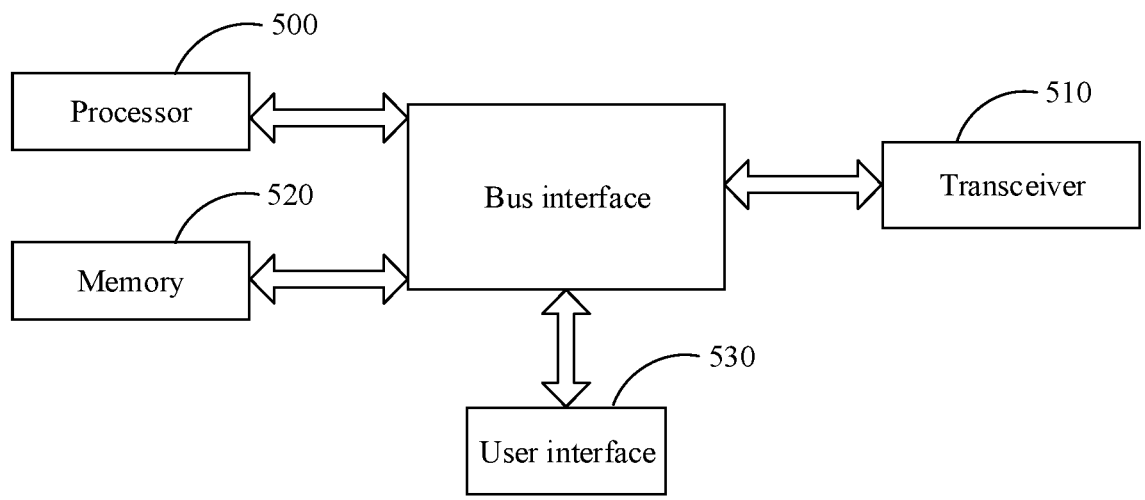
FIG. 5 is a first structural block diagram of a terminal according to an embodiment of the present disclosure.

To better achieve the foregoing objectives, as shown in FIG. 5, an embodiment of the present disclosure further provides a terminal, including a memory 520, a processor 500, a transceiver 510, a user interface 530, a bus interface, and a computer program stored in the memory 520 and executable on the processor 500. The processor 500 is configured to read the program in the memory 520 to perform the following processes:
- when a connection failure occurred between the terminal and a master base station MN, reporting a radio connection failure indication of the MN to a secondary base station SN; and
- if receiving an RRC reconfiguration message before a target timer expires, performing reconfiguration processing according to the RRC reconfiguration message.

In FIG. 5, a bus architecture may include any quantity of interconnected buses and bridges, which are specifically connected together by various circuits of one or more processors represented by the processor 500 and a memory represented by the memory 520. The bus architecture may further connect together various other circuits of a peripheral device, a voltage stabilizer, a power management circuit, and the like, which are known in this art and are not further described herein. The bus interface provides an interface. The transceiver 510 may include a plurality of elements, that is, include a transmitter and a receiver, and provide units for communication with various other apparatuses on a transmission medium. For different user equipment, the user interface 530 may alternatively be an interface for externally and internally connecting a required device. The connected device includes, but is not limited to, a keypad, a display, a speaker, a microphone, a joystick, and the like.

The processor 500 is responsible for management of the bus architecture and general processing. The memory 520 may store data used by the processor 500 when operations are performed.

Optionally, a start time of the target timer includes:
a preset moment in a process of generating the radio connection failure indication of the MN; or
a moment at which a radio resource control RRC layer of the terminal submits the radio connection failure indication of the MN to a lower layer; or
a moment at which the radio connection failure indication of the MN is sent at an air interface.

Optionally, the RRC reconfiguration message is a reconfiguration message including a specific information element IE, and the specific information element IE is a synchronous reconfiguration IE, or a full configuration IE, or a master cell group IE, or a failure indication response IE; or
the RRC reconfiguration message is a reconfiguration message for instructing the terminal to modify a primary cell Pcell; or
the RRC reconfiguration message is a reconfiguration message for instructing the terminal to modify a radio link monitoring reference signal RS of a primary cell Pcell.

Optionally, the processor 500 reads the program in the memory 520 to further perform:
when the RRC layer receives the RRC reconfiguration message or performs the reconfiguration processing according to the RRC reconfiguration message, stopping the target timer.

Optionally, when the RRC reconfiguration message is a reconfiguration message including a synchronous reconfiguration IE;
the processor 500 reads the program in the memory 520 to further perform:
initiating a random access process according to the RRC reconfiguration message; and
if the RRC layer of the terminal receives, before the target timer expires, a random access success indication sent by a media access control MAC layer, stopping the target timer.

Optionally, the processor 500 reads the program in the memory 520 to further perform:
if the target timer expires, initiating an RRC connection re-establishment process.

Optionally, the MN radio link failure indication includes:
at least one of an MN radio connection failure reason and a measurement result of the terminal.

Figure 6:
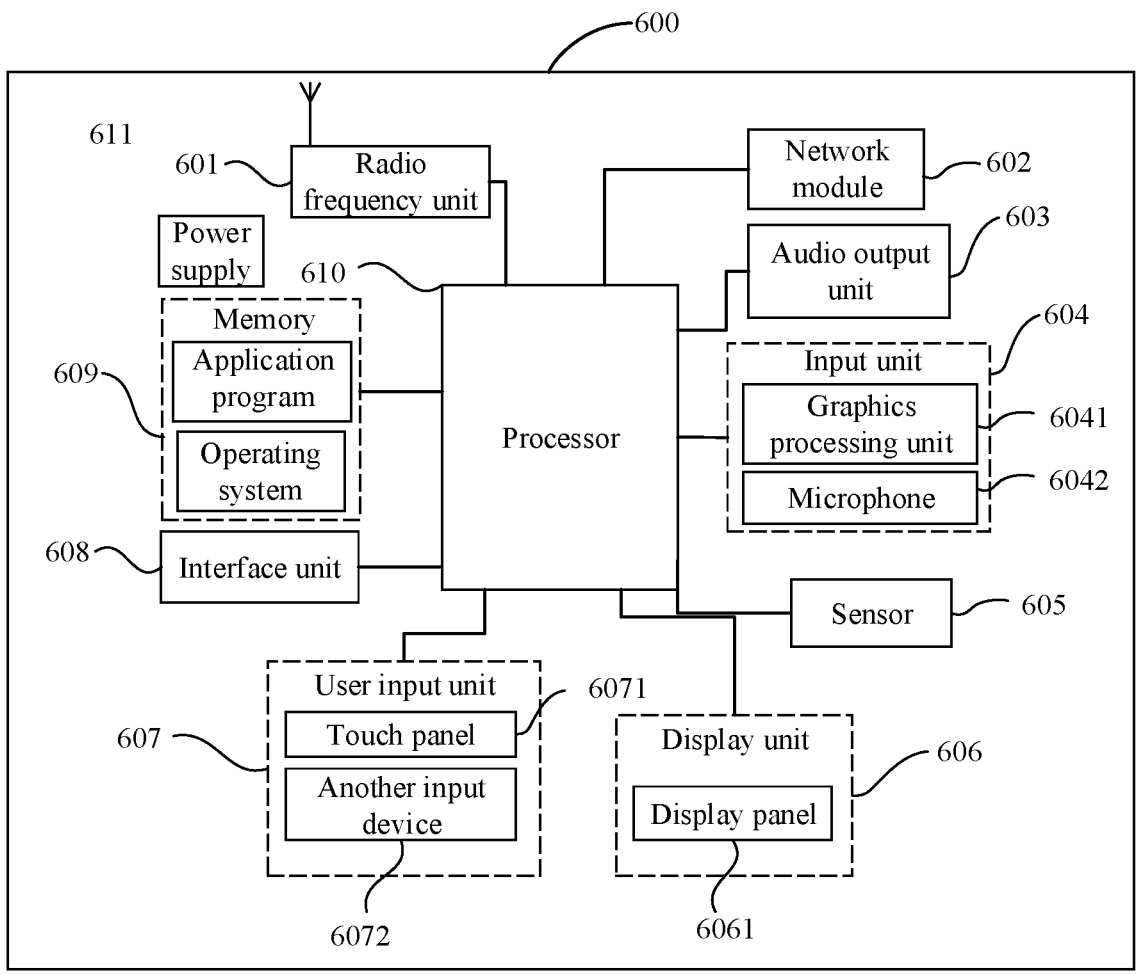
FIG. 6 is a second structural block diagram of a terminal according to an embodiment of the present disclosure.

FIG. 6 is a schematic structural diagram of hardware of a terminal implementing embodiments of the present disclosure. The terminal 600 includes, but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art may understand that the structure of the terminal shown in FIG. 6 does not constitute a limitation on the terminal. The terminal may include more or fewer components than those shown in the figure, or a combination of some components, or an arrangement of different components. In this embodiment of the present disclosure, the terminal includes, but is not limited to, a mobile phone, a tablet computer, a notebook computer, a palmtop computer, a vehicle-mounted terminal, a wearable device, a pedometer, or the like.

The processor 610 is configured to: when a connection failure occurred between the terminal and a master base station MN, report a radio connection failure indication of the MN to a secondary base station SN; and if the RRC reconfiguration message is received before a target timer expires, perform reconfiguration processing according to the RRC reconfiguration message.

In the technical solutions in the embodiments of the present disclosure, when the radio connection failure occurred between the terminal and the master base station MN, the radio connection failure indication of the MN is reported to the secondary base station SN; and if the RRC reconfiguration message is received before a target timer expires, reconfiguration processing is performed according to the RRC reconfiguration message, to prevent the UE from initiating an RRC connection re-establishment process, and therefore avoid the problem of interruption of data receiving and sending of the UE.

It should be understood that, in this embodiment of the present disclosure, the radio frequency unit 601 may be configured to receive and transmit signals during information receiving and sending or a call. Specifically, the radio frequency unit 601 receives downlink data from a base station, and transmits the downlink data to the processor 610 for processing; and in addition, transmits uplink data to the base station. Generally, the radio frequency unit 601 includes, but is not limited to, an antenna, at least one amplifier, a transceiver, a coupler, a low noise amplifier, a duplexer, and the like. In addition, the radio frequency unit 601 may further communicate with another device via a wireless communication system and a network.

The terminal provides a user with wireless broadband Internet access through the network module 602, for example, helps the user send and receive emails, browse web pages, and access streaming media.

The audio output unit 603 may convert audio data received by the radio frequency unit 601 or the network module 602 or stored in the memory 609 into an audio signal, and output the audio signal into sound. In addition, the audio output unit 603 may also provide audio output related to a specific function performed by the terminal 600 (for example, call signal receiving sound or message receiving sound). The audio output unit 603 includes a speaker, a buzzer, a telephone receiver, and the like.

The input unit 604 is configured to receive audio or video signals. The input unit 604 may include a graphics processing unit (Graphics Processing Unit, GPU) 6041 and a microphone 6042. The graphics processing unit 6041 processes image data of a static picture or a video obtained by an image capturing apparatus (for example, a camera) in a video capturing mode or an image capturing mode. A processed image frame may be displayed on the display unit 606. The image frame processed by the graphics processing unit 6041 may be stored in the memory 609 (or another storage medium) or sent via the radio frequency unit 601 or the network module 602. The microphone 6042 may receive sound and process such sound into audio data. Processed audio data may be converted, in a telephone call mode, into a format that may be sent to a mobile communications network device via the radio frequency unit 601 for output.

The terminal 600 further includes at least one sensor 605, such as a light sensor, a motion sensor, and other sensors. Specifically, the light sensor includes an ambient light sensor and a proximity sensor, where the ambient light sensor may adjust brightness of the display panel 6061 according to brightness of ambient light, and the proximity sensor may turn off the display panel 6061 and/or backlight when the terminal 600 moves towards the ear. As a type of motion sensor, an accelerometer sensor may detect accelerations in all directions (generally three axes), and may detect the magnitude and direction of gravity when it is still. The accelerometer sensor may be configured to identify a terminal posture (for example, switching between a landscape mode and a portrait mode, related games, and magnetometer posture calibration), perform vibration identification-related functions (for example, a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein again.

The display unit 606 is configured to display information entered by a user or information provided for the user. The display unit 606 may include the display panel 6061, and the display panel 6061 may be configured in a form of a liquid crystal display (Liquid Crystal Display, LCD), an organic light-emitting diode (Organic Light-Emitting Diode, OLED), or the like.

The user input unit 607 may be configured to receive inputted numeric or character information, and generate key signal inputs related to user settings and function control of the terminal. Specifically, the user input unit 607 includes a touch panel 6071 and another input device 6072. The touch panel 6071, also called a touch screen, may collect a touch operation of the user on or near the touch panel 6071 (for example, an operation performed by the user with any suitable object or accessory such as a finger or a stylus on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 610, receives a command sent by the processor 610, and executes the command. In addition, the touch panel 6071 may be implemented in various types such as resistive, capacitive, infrared, and surface acoustic wave. In addition to the touch panel 6071, the user input unit 607 may further include the another input device 6072. Specifically, the another input device 6072 may include, but is not limited to, a physical keyboard, function keys (such as a volume control key and a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides corresponding visual output on the display panel 6061 based on the type of the touch event. In FIG. 6, the touch panel 6071 and the display panel 6061 are used as two independent components to implement input and output functions of the terminal. However, in some embodiments, the touch panel 6071 and the display panel 6061 may be integrated to implement the input and output functions of the terminal. This is not specifically limited herein.

The interface unit 608 is an interface connecting an external apparatus to the terminal 600. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 608 may be configured to receive an input (for example, data information and power) from the external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 609 may include a high-speed random access memory or a nonvolatile memory, for example, at least one magnetic disk storage device, a flash memory, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Preferably, the processor 610 can be integrated with an application processor and a modem processor. The application processor mainly processes an operating system, a user interface, an application program, and the like. The modem processor mainly processes wireless communication. It can be understood that the modem processor is not necessarily integrated in the processor 610.

The terminal 600 may further include the power supply 611 (for example, a battery) supplying power to various components. Preferably, the power supply 611 may be logically connected to the processor 610 through a power management system, so as to implement functions such as managing charging, discharging, and power consumption through the power management system.

In addition, the terminal 600 includes some functional modules not shown, and details are not described herein again.

Figure 7:
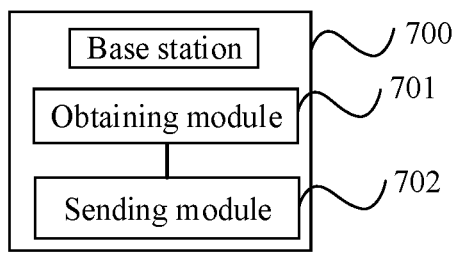
FIG. 7 is a schematic diagram of modules of a base station according to an embodiment of the present disclosure.

FIG. 7 is a schematic diagram of modules of a base station according to an embodiment of the present disclosure. As shown in FIG. 7, an embodiment of the present disclosure further provides a base station 700, including:

an obtaining module 701, configured to obtain a radio connection failure indication of the MN sent by a terminal; and a sending module 702, configured to send an RRC reconfiguration message to the terminal according to the radio connection failure indication of the MN.

In the base station according to an embodiment of the present disclosure, the RRC reconfiguration message is a reconfiguration message including a specific information element IE, and the specific information element IE is a synchronous reconfiguration IE, or a full configuration IE, or a master cell group IE, or a failure indication response IE; or the RRC reconfiguration message is a reconfiguration message for instructing the terminal to modify a primary cell Pcell; or the RRC reconfiguration message is a reconfiguration message for instructing the terminal to modify a radio link monitoring reference signal RS of a primary cell Pcell.

In the base station according to an embodiment of the present disclosure, the radio connection failure indication of the MN includes at least one of an MN radio connection failure reason and a measurement result of the terminal.

An embodiment of the present disclosure further provides a base station, including: a memory, a processor, and a computer program stored in the memory and executable on the processor. The computer program, when executed by the processor, implements the processes of the foregoing method embodiment of the reconfiguration method applied to the base station, and the same technical effects can be achieved. To avoid repetition, details are not described herein again.

An embodiment of the present disclosure further provides a computer-readable storage medium, where the computer-readable storage medium stores a computer program. The computer program, when executed by the processor, implements the processes of the foregoing method embodiment of the reconfiguration method applied to the base station, and the same technical effects can be achieved. To avoid repetition, details are not described herein again. The computer-readable storage medium is a read-only memory (Read-Only Memory, ROM), a random access memory (Random Access Memory, RAM), a magnetic disk, an optical disc, or the like.

Figure 8:
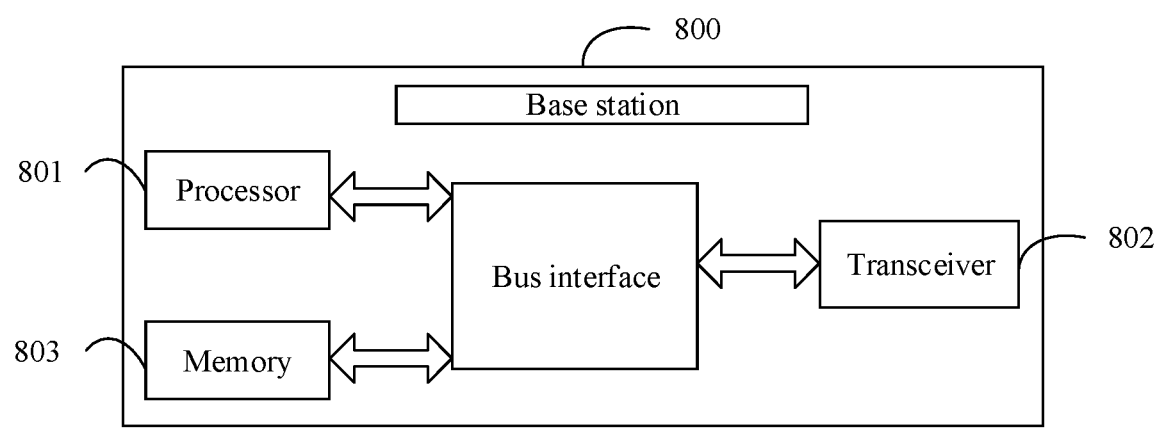
FIG. 8 is a structural block diagram of a base station according to an embodiment of the present disclosure.

As shown in FIG. 8, an embodiment of the present disclosure further provides a base station 800, including a processor 801, a transceiver 802, a memory 803, and a bus interface.

The processor 801 is configured to read a program in the memory 803 to perform the following process:

obtaining a radio connection failure indication of the MN sent by a terminal; and sending an RRC reconfiguration message to the terminal according to the radio connection failure indication of the MN.

In FIG. 8, a bus architecture may include any quantity of interconnected buses and bridges, which are specifically connected together by various circuits of one or more processors represented by the processor 801 and a memory represented by the memory 803. The bus architecture may further connect together various other circuits of a peripheral device, a voltage stabilizer, a power management circuit, and the like, which are well known in this art and are not further described herein. The bus interface provides an interface. The transceiver 802 may include a plurality of elements, that is, include a transmitter and a receiver, and provide units for communication with various other apparatuses on a transmission medium.

The processor 801 is responsible for managing the bus architecture and common processing, and the memory 803 may store data used when the processor 801 performs an operation.

Optionally, the RRC reconfiguration message is a reconfiguration message including a specific information element IE, and the specific information element IE is a synchronous reconfiguration IE, or a full configuration IE, or a master cell group IE, or a failure indication response IE; or the RRC reconfiguration message is a reconfiguration message for instructing the terminal to modify a primary cell Pcell; or the RRC reconfiguration message is a reconfiguration message for instructing the terminal to modify a radio link monitoring reference signal RS of a primary cell Pcell.

Optionally, the radio connection failure indication of the MN includes at least one of an MN radio connection failure reason and a measurement result of the terminal.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. In the absence of more limitations, an element defined by "including a . . . " does not preclude the existence of other identical elements in the process, method, article, or apparatus that includes the element.

Based on the foregoing descriptions of the implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or a compact disc), and includes several instructions for instructing a terminal (which may be a mobile phone, a computer, a server, an air conditioner, a network device, or the like) to perform the methods described in the embodiments of the present disclosure.

The embodiments of the present disclosure are described with reference to the accompanying drawings. However, the present disclosure is not limited to the foregoing specific implementations. The foregoing specific implementations are merely an example, but are not limiting. A person of ordinary skill in the art may make many forms without departing from the objective of the present disclosure and the protection scope of the claims.

The invention claimed is:

1. A reconfiguration method, applied to a terminal, wherein the terminal is connected to at least two base stations, and the method comprises:

in response to that a connection failure occurred between the terminal and a master base station MN, reporting a radio connection failure indication of the MN to a secondary base station SN; and in response to receiving an RRC reconfiguration message before a target timer expires, performing reconfiguration processing according to the RRC reconfiguration message;

wherein a start time of the target timer comprises:

a preset moment in a process of generating the radio connection failure indication of the MN; or a moment at which a radio resource control RRC layer of the terminal submits the radio connection failure indication of the MN to a lower layer; or a moment at which the radio connection failure indication of the MN is sent at an air interface.

2. The reconfiguration method according to claim 1, wherein
the RRC reconfiguration message is a reconfiguration message comprising a specific information element IE, and the specific information element IE is a synchronous reconfiguration IE, or a full configuration IE, or a master cell group IE, or a failure indication response IE; or
the RRC reconfiguration message is a reconfiguration message for instructing the terminal to modify a primary cell Pcell; or
the RRC reconfiguration message is a reconfiguration message for instructing the terminal to modify a radio link monitoring reference signal RS of a primary cell Pcell.

3. The reconfiguration method according to claim 1, further comprising:
in response to that the RRC layer receives the RRC reconfiguration message or performs the reconfiguration processing according to the RRC reconfiguration message, stopping the target timer.

4. The reconfiguration method according to claim 2, wherein in response to that the RRC reconfiguration message is a reconfiguration message comprising a synchronous reconfiguration IE;
after the performing reconfiguration processing according to the RRC reconfiguration message, the method further comprises:
initiating a random access procedure according to the RRC reconfiguration message; and
in response to that the RRC layer of the terminal receives, before the target timer expires, a random access success indication sent by a media access control MAC layer, stopping the target timer.

5. The reconfiguration method according to claim 1, after the reporting a radio connection failure indication of the MN to a secondary base station SN, further comprising:
in response to that the target timer expires, initiating an RRC connection re-establishment procedure.

6. The reconfiguration method according to claim 1, wherein the radio connection failure indication of the MN comprises:
at least one of an MN radio connection failure reason or a measurement result of the terminal.

7. A terminal, wherein the terminal is connected to at least two base stations, and comprises: a memory, a processor, and a computer program stored in the memory and executable on the processor, wherein the computer program is executed by the processor to:
in response to that a connection failure occurred between the terminal and a master base station MN, report a radio connection failure indication of the MN to a secondary base station SN; and
in response to receiving an RRC reconfiguration message before a target timer expires, perform reconfiguration processing according to the RRC reconfiguration message;
wherein a start time of the target timer comprises:
a preset moment in a process of generating the radio connection failure indication of the MN; or
a moment at which a radio resource control RRC layer of the terminal submits the radio connection failure indication of the MN to a lower layer; or
a moment at which the radio connection failure indication of the MN is sent at an air interface.

8. The terminal according to claim 7, wherein
the RRC reconfiguration message is a reconfiguration message comprising a specific information element IE, and the specific information element IE is a synchronous reconfiguration IE, or a full configuration IE, or a master cell group IE, or a failure indication response IE; or
the RRC reconfiguration message is a reconfiguration message for instructing the terminal to modify a primary cell Pcell; or
the RRC reconfiguration message is a reconfiguration message for instructing the terminal to modify a radio link monitoring reference signal RS of a primary cell Pcell.

9. The terminal according to claim 7, wherein the computer program is executed by the processor to:
in response to that the RRC layer receives the RRC reconfiguration message or performs the reconfiguration processing according to the RRC reconfiguration message, stop the target timer.

10. The terminal according to claim 8, wherein in response to that the RRC reconfiguration message is a reconfiguration message comprising a synchronous reconfiguration IE, the computer program is executed by the processor to:
after performing reconfiguration processing according to the RRC reconfiguration message, initiate a random access process according to the RRC reconfiguration message; and
in response to that the RRC layer of the terminal receives, before the target timer expires, a random access success indication sent by a media access control MAC layer, stop the target timer.

11. The terminal according to claim 7, wherein the computer program is executed by the processor to:
after reporting the MN radio link failure indication to the secondary base station SN, in response to that the target timer expires, initiate an RRC connection re-establishment process.

12. The terminal according to claim 7, wherein the radio connection failure indication of the MN comprises:
at least one of an MN radio connection failure reason or a measurement result of the terminal.

13. A non-transitory computer-readable storage medium, wherein the non-transitory computer-readable storage medium stores a computer program, and the computer program is executed by a processor to:
in response to that a connection failure occurred between the terminal and a master base station MN, report a radio connection failure indication of the MN to a secondary base station SN; and
in response to receiving an RRC reconfiguration message before a target timer expires, perform reconfiguration processing according to the RRC reconfiguration message;
wherein a start time of the target timer comprises:
a preset moment in a process of generating the radio connection failure indication of the MN; or
a moment at which a radio resource control RRC layer of the terminal submits the radio connection failure indication of the MN to a lower layer; or
a moment at which the radio connection failure indication of the MN is sent at an air interface.

14. The non-transitory computer-readable storage medium according to claim 13, wherein
the RRC reconfiguration message is a reconfiguration message comprising a specific information element IE, and the specific information element IE is a synchronous reconfiguration IE, or a full configuration IE, or a master cell group IE, or a failure indication response IE; or the RRC reconfiguration message is a reconfiguration message for instructing the terminal to modify a primary cell Pcell; or the RRC reconfiguration message is a reconfiguration message for instructing the terminal to modify a radio link monitoring reference signal RS of a primary cell Pcell.

15. The non-transitory computer-readable storage medium according to claim 13, wherein the computer program is executed by the processor to:

in response to that the RRC layer receives the RRC reconfiguration message or performs the reconfiguration processing according to the RRC reconfiguration message, stop the target timer.

16. The non-transitory computer-readable storage medium according to claim 13, wherein after the radio connection failure indication of the MN is reported to a secondary base station SN, the computer program is executed by the processor to:

in response to that the target timer expires, initiate an RRC connection re-establishment procedure.

17. The non-transitory computer-readable storage medium according to claim 13, wherein the radio connection failure indication of the MN comprises:

at least one of an MN radio connection failure reason or a measurement result of the terminal.

18. The non-transitory computer-readable storage medium according to claim 14, wherein in response to that the RRC reconfiguration message is a reconfiguration message comprising a synchronous reconfiguration IE, the computer program is executed by the processor to:

after performing reconfiguration processing according to the RRC reconfiguration message, initiate a random access process according to the RRC reconfiguration message; and in response to that the RRC layer of the terminal receives, before the target timer expires, a random access success indication sent by a media access control MAC layer, stop the target timer.

* * * * *